United States Patent [19]

Keritsis

[11] Patent Number: 4,865,336
[45] Date of Patent: Sep. 12, 1989

[54] APPARATUS FOR SECURING A CUTTING TOOL IN A TOOL HOLDER AND MACHINE TOOLS EMPLOYING THE SAME

[75] Inventor: George Keritsis, Knoxville, Tenn.
[73] Assignee: Carboloy Inc., Warren, Mich.
[21] Appl. No.: 202,475
[22] Filed: Jun. 3, 1988
[51] Int. Cl.⁴ .............................................. B23B 31/04
[52] U.S. Cl. .................... 279/1 N; 279/1 J; 279/1 ME; 279/103; 409/234
[58] Field of Search ............... 279/1 N, 1 B, 1 C, 1 J, 279/1 ME, 102, 103; 408/239 A; 409/232, 234

[56] References Cited

U.S. PATENT DOCUMENTS

| | | | |
|---|---|---|---|
| 2,440,908 | 5/1948 | Mueller | 279/46 |
| 2,861,471 | 11/1958 | Kronenberg | 279/1 ME |
| 3,521,846 | 7/1970 | Matsumoto | 279/102 |
| 4,021,051 | 5/1977 | Toyomoto et al. | 279/1 N |
| 4,692,069 | 9/1987 | Kieninger | 408/108 X |
| 4,721,423 | 1/1988 | Kubo | 279/1 N X |

OTHER PUBLICATIONS

Richmill Cat. No. 88002 M 25, "Milling Chuck Systems".

Primary Examiner—Steven C. Bishop
Attorney, Agent, or Firm—Hedman, Gibson, Costigan & Hoare

[57] ABSTRACT

An apparatus and tool assembly containing the same which includes a rotatable ring and a series of bearings in contact with the inner surface of the rotatable ring wherein the bearings are angled with respect to the longitudinal axis of the cutting tool assembly so that when the ring is rotated, it moves axially toward the tool holder along a helical path to thereby compress a tube containing the shaft of the cutting tool and thereby secure the cutting tool in the tool holder.

54 Claims, 6 Drawing Sheets

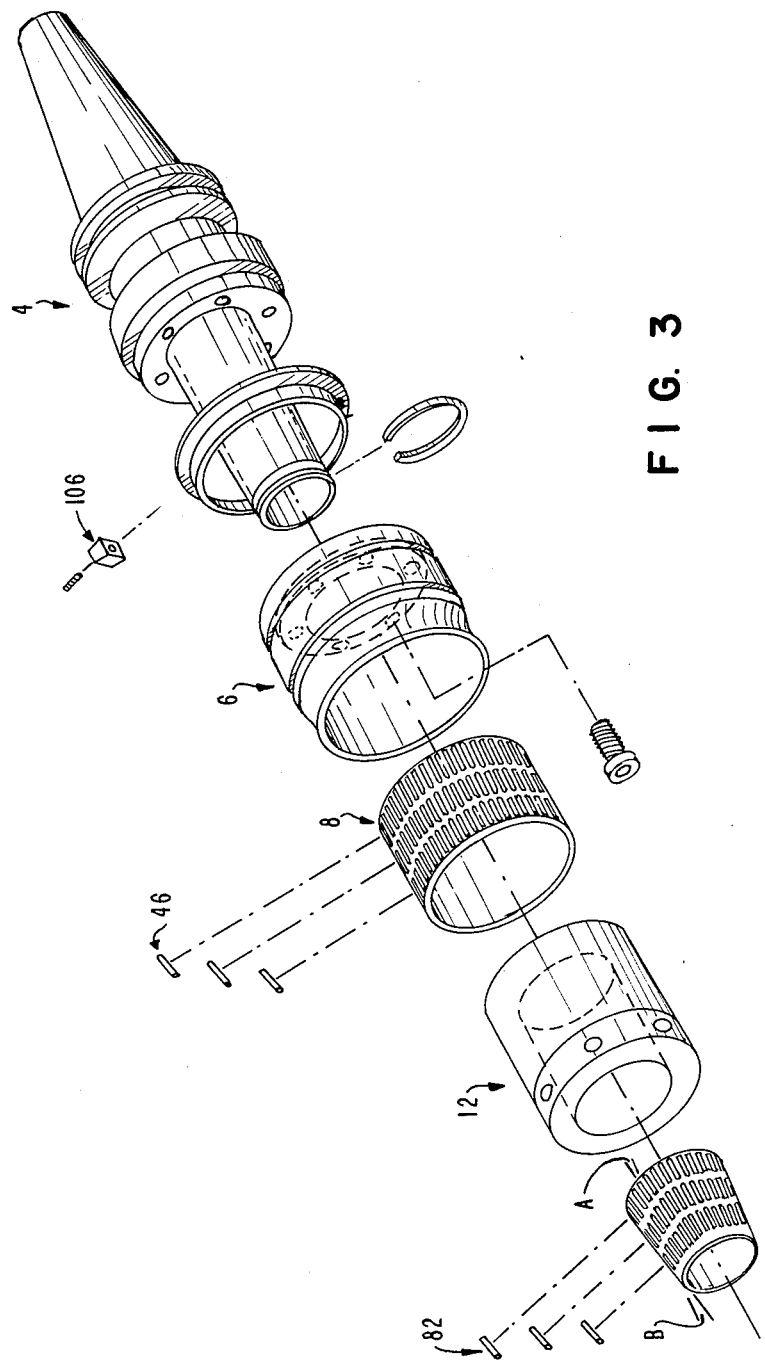

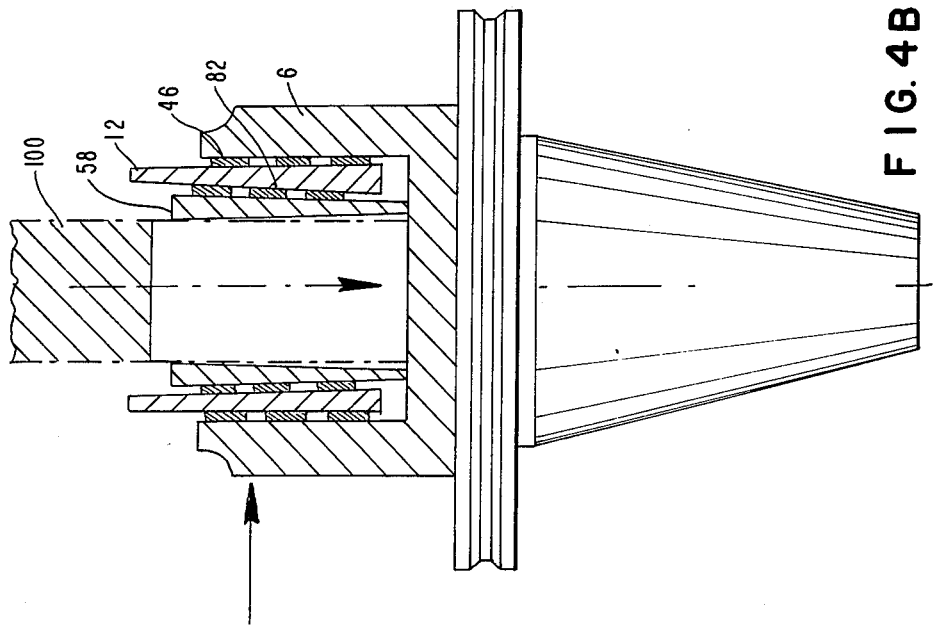
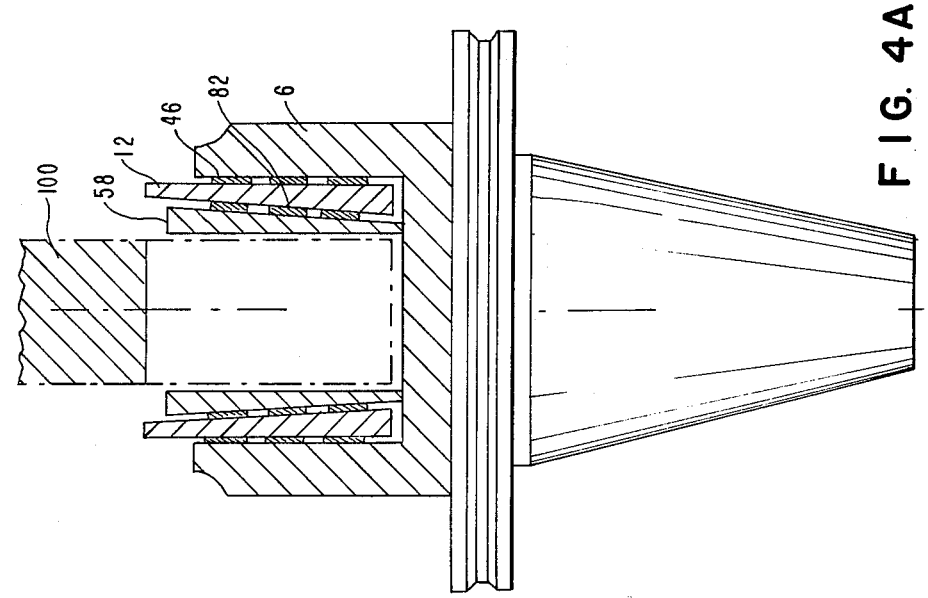

APPARATUS FOR SECURING A CUTTING TOOL IN A TOOL HOLDER AND MACHINE TOOLS EMPLOYING THE SAME

FIELD OF THE INVENTION

The present invention is generally directed to a device for securing a cutting tool in a tool holder and particularly to a tool chuck which includes a bearing means comprising a conical housing containing angled slots each of which is fitted with a bearing. A ring is adapted to rotate about the bearing means in a helical path to thereby radially compress a cutting tool receiving housing about the shaft of a cutting tool. The tool chuck of the invention provides a maximum gripping force to eliminate deflection of the cutting tool.

BACKGROUND OF THE INVENTION

The securing of a cutting tool in a tool holder of a machine tool has presented problems in the cutting tool industry. The tool holder typically has a tapered shank which is secured to the machine tool and a cavity for receiving the cutting tool. The cutting tool has a shank or tool body insertable into the cavity and an opposed end having at least one cutting insert assembly.

The cutting tool shank is generally secured in the cavity through the use of a machine tool collet which is compressible about the shank of the cutting tool. A typical machine tool collet is described in Hoyle et al, U.S. Pat. No. 4,705,439.

The collet is typically made with a series of spaced-apart slits around the circumference of the collet, which enable the collet to expand or contract around the cutting tool to thereby provide a secure fit.

Although collets are effectively employed for relatively low speed cutting operations, problems arise when trying to secure a cutting tool with a collet in machine tools operated at above 10,000 rpm. This is because the inner surface of the fingers formed between the adjacent axial slits do not provide full face to face contact with the shank of the cutting tool. In most cases, only single line or double line contact is made and therefore the maximum compressive force provided by a collet against the shank is often less than desirable for securing a cutting tool under high speed operations.

Applicant has discovered a unique system for locking a cutting tool in a tool holder in which the use of collets is eliminated and the compressive force generated on the cutting tool shank greatly exceeds that provided by typical collets.

It is therefore an object of the invention to provide a device for locking a cutting tool in a tool holder without the use of a machine tool collet.

It is another object of the invention to provide a chuck which employs angled bearings which enables a rotatable ring to generate a compressive radial force for locking the cutting tool within a tool holder.

It is a further object of the invention to provide a chuck which provides a 360° radially centered compressive force in the direction of the shank of the cutting tool and also enables axial adjustment of the cutting tool within the tool holder.

It is a still further object of the invention to provide a chuck which exerts both a 360° radially centered compressive force on the cutting tool and also an axial force in the direction of the tool holder to thereby maximize the locking force acting on the cutting tool to thereby eliminate deflection.

SUMMARY OF THE INVENTION

The present invention is directed to an apparatus for securing a cutting tool in a tool holder and to a cutting tool assembly employing the same.

The apparatus comprises a stationary ring which is adapted to be mounted to or integral with the tool holder and circumscribes a cutting tool receiving housing extending from one end of the tool holder. There is also provided a first bearing means having an inner and outer bearing surface. The outer bearing surface is adapted to engage the inner surface of the stationary ring.

A second bearing means is provided which includes a conical housing containing at least one row of bearing receiving slots circumscribing the housing, each slot being positioned at an angle with respect to the longitudinal axis of the tool holder. A bearing is securable in each of the slots. Each of the bearings has an inner and outer bearing surface. The inner bearing surface is adapted to engage the outer surface of the cutting tool receiving housing.

The apparatus also includes a rotatable ring comprising a conical shaped axial hole having an inner surface adapted to engage the outer bearing surface of the bearings of the second bearing means. The rotatable ring also includes a substantially cylindrical outer surface which is adapted to engage the inner bearing surface of the first bearing means.

When the rotatable ring is rotated about its axis, it is caused to move in a screw-like manner as it follows the helical path of the bearings of the second bearing means. During rotation, the conical axial hole of the rotatable ring applies a 360° radially centered compressive force against the second bearing means which in turn provides a corresponding 360° radially centered compressive force against the cutting tool receiving housing thereby forcibly securing the cutting tool shank within said housing. In addition, the rotatable ring may also provide a tensioning of the housing.

The cutting tool assembly further includes a tool holder adapted to be secured within a machine tool such as a machining center. The tool holder has the cutting tool receiving housing extending from the end of the tool holder opposed to the machine tool. The cutting tool has a shank which is adapted to be inserted into the cutting tool receiving housing of the tool holder. At an opposed end thereof there is provided at least one cutting insert assembly.

In accordance with the present invention, the outer surface of the cutting tool receiving housing, the second bearing means and the conical axial hole of the rotatable ring are tapered to facilitate the 360° radially centered compressive force produced by the rotatable ring and to compress the cutting tool receiving housing to securely lock the cutting tool in the tool holder.

BRIEF DESCRIPTION OF THE DRAWINGS

The following drawings in which like reference characters indicate like parts are illustrative of embodiments of the invention and are not intended to limit the scope of the invention as encompassed by the claims of the application.

FIG. 3 is an exploded perspective view of another embodiment of the invention in which the apparatus exerts a 360° radially centered compressive force on the cutting tool receiving housing and also provides for outward axial adjustment of the cutting tool within the tool holder;

FIG. 4A is a partial cross-sectional view of the embodiment shown in FIG. 1 showing the shaft of the cutting tool within the cutting tool receiving housing before the application of the 360° radially centered compressive force;

FIG. 4B is a partial cross-sectional view similar to FIG. 4A showing the application of a 360° radially centered and inwardly directed compressive force on the cutting tool receiving housing;

DETAILED DESCRIPTION OF THE INVENTION

Figure 1:
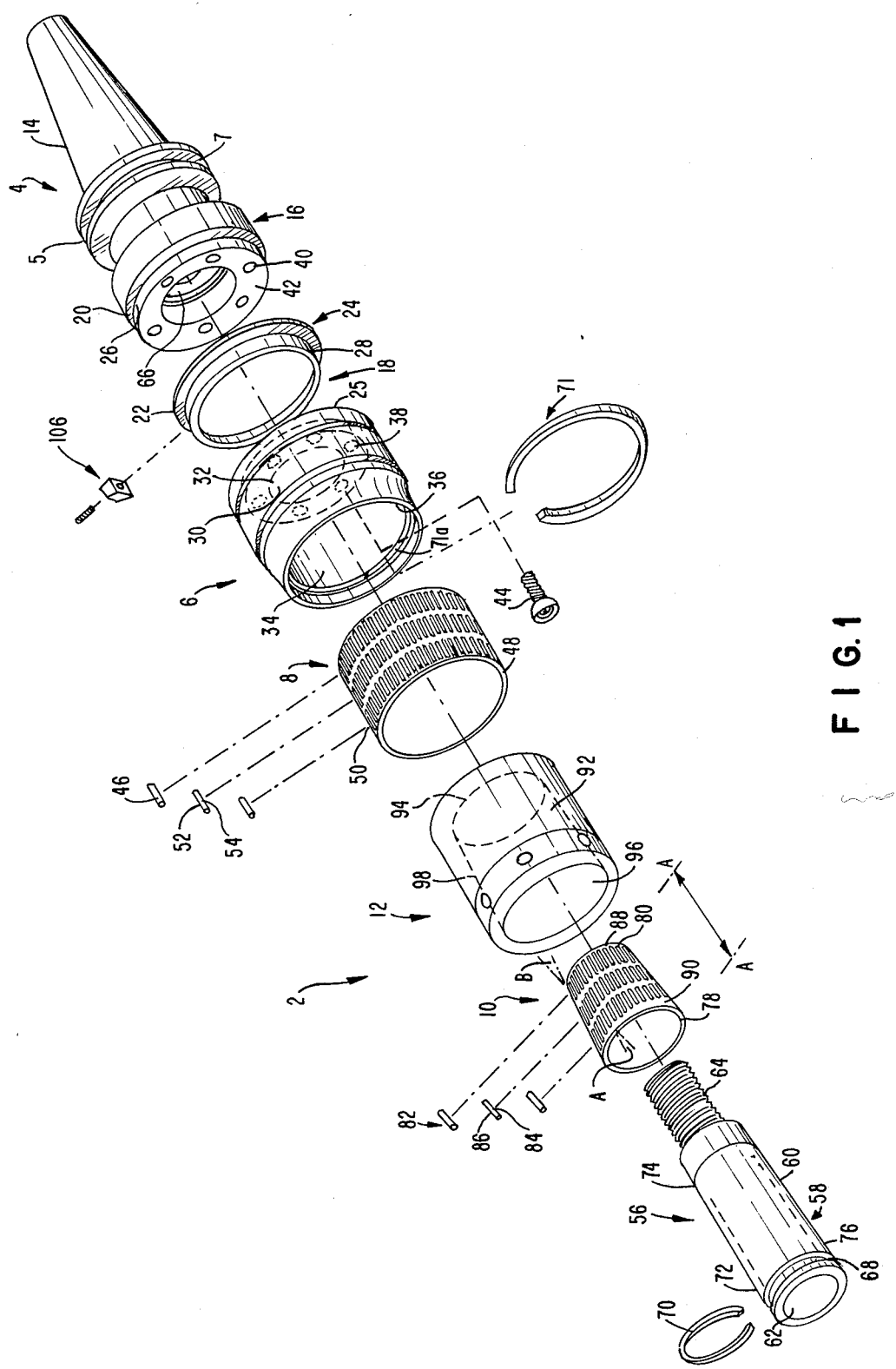
FIG. 1 is an exploded perspective view of one embodiment of the invention in which the apparatus exerts maximum 360° radially centered compressive force on the cutting tool receiving housing and pulls the shaft of the cutting tool towards the tool holder.

Referring to the drawings and particularly to FIGS. 1, 4A and 4B, there is shown the device 2 of the present invention and its relative position with respect to a tool holder 4. The device 2 includes a stationary ring 6, a first bearing means 8, a second bearing means 10 and a rotatable ring 12.

The tool holder 4 includes a shank 14 adapted to be inserted into a machine tool (not shown) by an annular flange 5 and groove 7 arrangement. As shown in FIG. 1, the flange 5 may be continuous or may employ keys in key slots (not shown) as is customarily used in the industry. The continuous flange 5 is preferred as shown in FIG. 1 to minimize the deflection of machine fluids (e.g. lubricants and/or coalants) under high speed cutting operations. At one end of the shank 14 is a collar 16 having surfaces 20 and 26 and a ring 24 formed by a wall 22 and a base 28 which defines an annular channel 18 for housing weight balancing means as described in detail hereinafter.

As shown in FIG. 1, the annular channel 18 is formed by the forward wall 22 of the ring 24 and a rearward surface 25 of the stationary ring 6, separated by the base 28. The ring 24 serves the additional purpose of acting as a spacer for the stationary ring 6. As described hereinafter the stationary ring 6 may be formed integral with the tool holder 4 with the annular channel 18 positioned between the stationary ring 6 and the tool holder 4.

The ring 24 has an annular base 28 and together with the forward wall 22 forms two sides of the annular channel 18 of the balancing means. The stationary ring 6 has a wall 25 forming the third side of the annular channel 18.

The stationary ring 6 includes an axial hole 30 having a rearward opening 32 and a forward opening 34 and an interior surface 36. The stationary ring 6 has a plurality of spaced-apart holes 38 circumscribing the rearward opening 32 which are matable with corresponding holes 40 on the face 42 of the tool holder 4. The stationary ring 6 may be secured to the tool holder 4 on the ring 24 by driving screws 44 through the holes 38 and into the thread receiving grooves of the holes 40 of the tool holder 4.

The interior surface 36 of the stationary ring 6 is adapted to contact the first bearing means 8. The first bearing means 8 includes at least one row of bearings 46. The bearings 46 may be arranged without constraint in rows along the interior surface 36 of the stationary ring 6.

It is preferred, however, to captivate the bearings 46 in a cage 48 as shown specifically in FIG. 1. The cage 48 includes at least one row (three rows are shown) of bearing receiving slots 50. The slots are arranged substantially parallel to the longitudinal axis of the cage 48 and each row of slots circumscribes the cage 48.

The bearings 46 are dimensioned to be retained within the slots 50. Each bearing 46 has an inner surface 54 and an outer surface 52. The cage 48 is insertable into the forward opening 34 of the stationary ring 6 in a manner so that the outer surface 52 of each bearing 46 is in contact with the interior surface 36 of the stationary ring 6.

The tool holder 4 has extending forward from the face 42, a cutting tool receiving housing 56. The housing 56 includes a tube section 58 having a cylindrical axial bore 60 with a forward opening 62 in which is inserted a correspondingly cylindrical-shaped shaft of a cutting tool.

The housing 56 has a threaded extension 64 adapted to be driven into a grooved axial hole 66 of the tool holder 4. The opposed end of the tube section 58 has an annular groove 68 for receiving a snap ring 70.

Figure 2A:
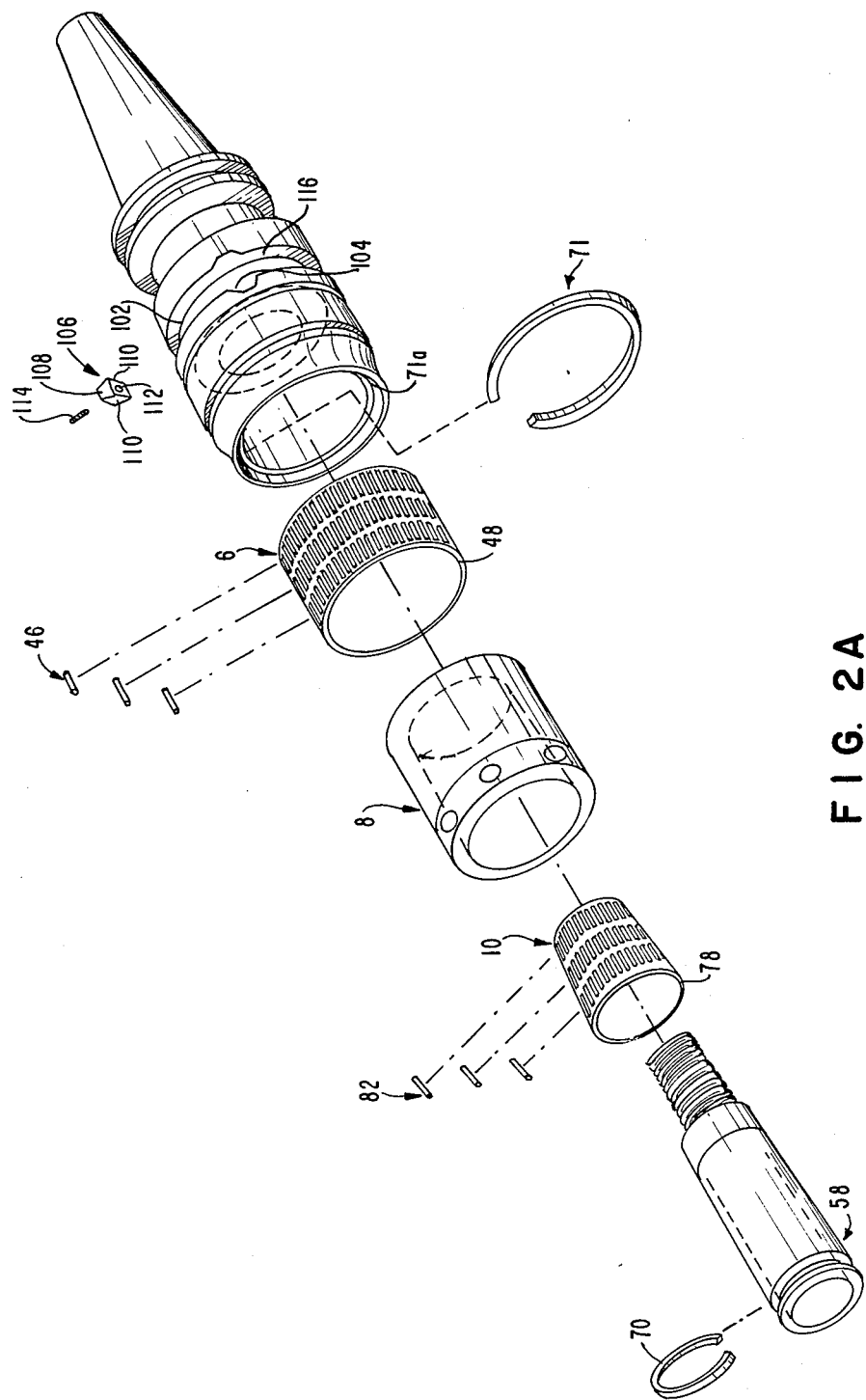
FIG. 2A is an exploded perspective view of a preferred embodiment of the invention in which the stationary ring is integral with the tool holder.
Figure 2B:
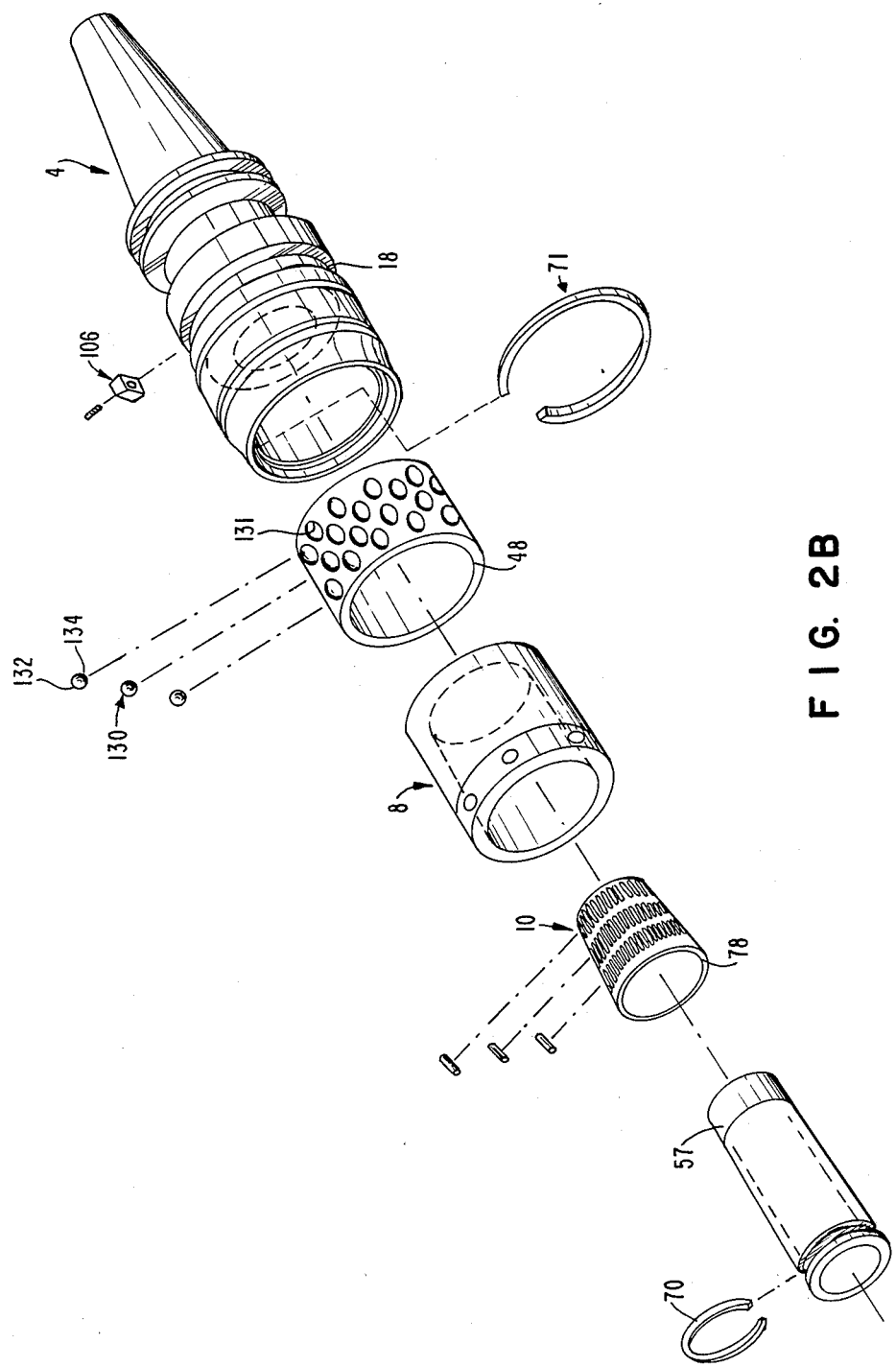
FIG. 2B is an exploded perspective view similar to FIG. 2 with ball bearings employed for the first bearing means.

As shown in the embodiments described in FIGS. 1, 2A and 2B, the snap ring 70 extends radially outward from the groove 68 to thereby provide a means of preventing the rotatable ring 12 from moving too far toward the forward end 76 of the cutting tool receiving housing 56. As a result, the force exerted by the rotatable ring 12 is controlled to prevent possible damage to the cutting tool receiving housing 56.

There may also be provided a snap ring 71 insertable into a groove 71A of the stationary ring 6. The snap ring 71 acts as a containment means in the embodiment of FIG. 1, preventing unwanted movement of the first bearing means 8. In the embodiment shown in FIG. 2B, the snap ring 71 acts as a containment means for all of the components of the apparatus.

The outer surface 72 of the tube section 58 is tapered from the rearward end 74 to the forward end 72 by an angle "B" of about ¼° to 10° with respect to the longitudinal axis of the tube section 58, most preferably in the range of about 1 to 5°.

The second bearing means 10 is adapted to fit over the tube section 58. The second bearing means 10 comprises a conical cage 78 having at least one row (three rows are shown) of bearing receiving slots 80, each slot containing a bearing 82 having an inner surface 84 and an outer surface 86. The slots of each row are angled by an angle "A" sufficient to provide a helical pathway for the movement of the rotatable ring 12 as described in detail hereinafter.

The angle "A" is preferable from about ½° to 10° with respect to the longitudinal axis of the cage 78 and the tube section 58 of the tool holder, preferably from about 1° to 5°, most preferably about 2°.

As previously indicated, the cage 78 has a conical shape. As shown in FIG. 1, the cage 78 has an inward taper from the forward end 90 to the rearward end 88. The angle of taper "B" is from about ½ to 10° preferably about 1° to 5°. Therefore, in the embodiment shown in FIG. 1, the tube section 58 has essentially the same angle of taper from the forward end 72 to the rearward end 74 as that of cage 78.

The bearings 82 of the cage 78 are preferably needle bearings and are preferably arranged in at least 2 rows, preferably at least three rows. This is because the length of each bearing 82 should be restricted due to their angled orientation to enable the rotatable ring 12 to move smoothly along the helical path created by the rows of angled bearings 82. Therefore as the angle "A" increases, the length of the bearings 82 decreases in order to minimize the deflection of the bearings required for desired contact. To accomodate the overall length of the cage 78, more rows of bearings are necessary as the length of the individual bearings decreases.

It is preferred that the total length of the aligned rows of bearings represented by the line A—A in FIG. 1 be at least one and one half times the diameter of the bore 60 of the cutting tool receiving housing 56. For example, a preferred arrangement of the bearings 82 includes three rows with each bearing having a length of about ⅛" and a diameter of about 1/16". Thus, the diameter of the bore 60 of the cutting tool receiving housing 56 should be about ¾".

The rotatable ring 12 includes a conical shaped axial hole 92 having a forward opening 96, a rearward opening 94 and an interior surface 98. The axial hole 92 is adapted to receive the cage 78 of the second bearing means 10 such that the inner surface 84 of the bearings 82 are in contact with the interior surface 98 of the rotatable ring 12.

The angle of taper of the axial hole 92 is essentially the same as the angle of taper B of the second bearing means 10 and the tube section 58 of the tool holder 4.

In operation, the stationary ring 6 has the first bearing means 8 inserted therein such that the outer surface 52 of the bearings 46 are in contact with the interior surface 36. The second bearing means 10 is inserted into the axial hole 92 of the rotatable ring 12 through the forward opening 96 and then both the rotatable ring 12 along with the second bearing means 10 are inserted into the first bearing means 8.

The cutting tool receiving housing 56 is then placed into the second bearing means 10 such that the inner surface 84 of the bearings 82 contact the outer surface 72 of the tube section 58 while simultaneously being screwed into the axial bore 66 of the tool holder 4. The shank 100 of a cutting tool is then placed into the axial bore 60 of the tube section 58 as shown in FIG. 4A.

The rotatable ring 12 is then rotated, and as a result of the helical path created by the angular orientation of the bearings 82, the rotatable ring 12 is caused to move toward the tool holder 4. As a result, the inner surface 98 of the rotatable ring 12 applies a compressive essentially 360° radially centered force on the second bearing means 10 and more specifically to the outer surface 86 of the individual bearings 82 which transmits the same force to the tube section 58 so that the forward end 76 of the tube section 58 is pressed against the shank 100, as shown in FIG. 4B.

Because the compressive force is directed at the forward end 76 of the tube section 58, the shank 100 is inversely drawn or pulled toward the rearward end 74 of the tube section 58 in the direction of the arrow shown in FIG. 4B. The total force applied to the shank 100 is of sufficient magnitude to secure the cutting tool in the tube section 58 even if the cutting tool is rotating in excess of 10,000 rpm.

During the operation wherein the force is transmitted to the cutting tool receiving housing 56 through the bearings 82, the bore 60 of the cutting tool receiving housing is desirably centrally aligned with the longitudinal axis of the tool holder 4. This assures that the cutting tool receiving housing 56 will provide optimal concentric integrity. To optimally achieve this end, it is preferred that the cutting tool receiving housing 56 be flexible with respect to the bore 60 centerline relationship to the center axis of the tool holder 4 while rigidly supported by the relatively large cross-sectional mass of the stationary ring 6. Upon tightening the apparatus, the bore 60 will self-align its centerline axis to be in common true location with the centerline of the stationary ring 6. It is therefore preferred that the stationary ring 6 be formed integral with the tool holder 4.

Referring to FIG. 2A, the stationary ring 6 is shown integral with the tool holder 4. Accordingly, the screws 44 and stationary ring holes 38 and tool holder holes 40 previously described in connection with FIG. 1 are dispensed with.

In addition, the annular channel 18 for housing the balancing weight means is formed in the junction between the stationary ring 6 and the tool holder 4. More specifically, the balancing weight means particularly suited for use in the present invention is that described in applicant's copending application Ser. No. 198,977 incorporated herein by reference.

The balancing system described therein eliminates the need for individual drilled holes in favor of an annular channel containing captive weights which may be moved to any position along the perimeter of the cutting tool. This system is particularly advantageous because the cutting tool can be readily rebalanced after the stress on the cutting tool has been relieved after initial operation under high speed conditions.

The annular channel 18 is made up of a flat base 102 and a pair of tapered walls 104 extending from the base 102. The balancing weight 106 comprises a block 108 having opposed tapered walls 110 adapted to engage the corresponding tapered walls 104 of the annular channel 18. The block 108 also has an axial hole 112 which is adapted to receive a screw means 114 therein.

The annular channel 18 may also be provided with a balancing weight receiving area 116 wherein the distance between the walls 104 is expanded to enable the balancing weight to be easily inserted therein and moved within the channel 18 to the desired location. The walls 104 in the receiving area 116 need not be tapered since the balancing weight 106 need not be secured into position in this area.

The balancing weight 106 is secured within the channel 18 by driving the screw means 114 through the threaded axial hole 112 until the end of the screw means 114 contacts the base 102 of the annular channel 18. As a result, the balancing weight 106 rides up the screw means 114 causing the tapered wall 110 to wedgingly engage the corresponding tapered walls 104 of the annular channel 18.

Other embodiments of the balancing weight system are described in detail in said copending application.

Referring to FIG. 2B, there is shown another embodiment of the invention wherein the first bearing means is provided with rows of ball bearings 130 having an outer surface 132 and an inner surface 134. The bearings 130 are adapted to be retained in slots 131 operate in an essentially the same manner as the needle bearings 46 described previously. The ball bearings 130 however, are preferred because they facilitate axial sliding motion and rotational motion of the first bearing means 8, especially when the first bearing means 8 is pulled back in concert with the rotatable ring 12 as it is is rotated to produce a compressive force on the cutting tool receiving housing 56.

Also shown in FIG. 2B, the cutting tool receiving housing 56 may have a tail section 57 which is adapted to be loosely fitted into the bore 66. This provides the maximum flexibility of the cutting tool receiving housing 56 when the rotatable ring 12 is rotated to the 360° radially centered compressive force exerting position. The housing 56 thereby aligns its longitudinal location to the tool holder 4 as the 360° radially centered compressive force is applied by the rotatable ring 12, thus causing axial movement such as in the fully compressed position, whereby the housing 56 is perfectly aligned with the tool holder 4 to insure optimum positioning of the cutting tool secured therein.

Figure 5B:
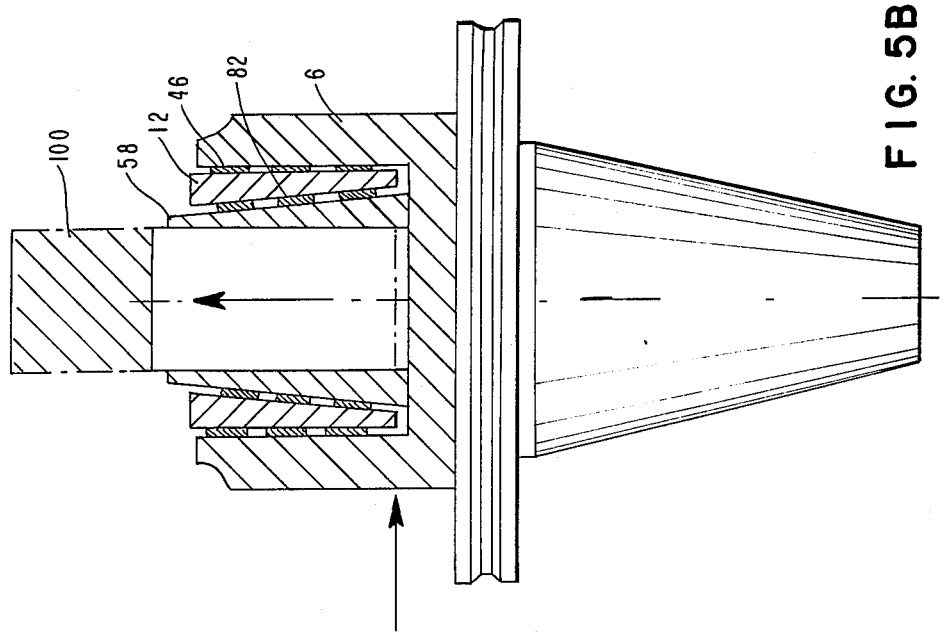
FIG. 5B is a partial cross-sectional view similar to FIG. 5A showing the application of a 360° radially centered compressive force on the cutting tool receiving housing.
Figure 5A:
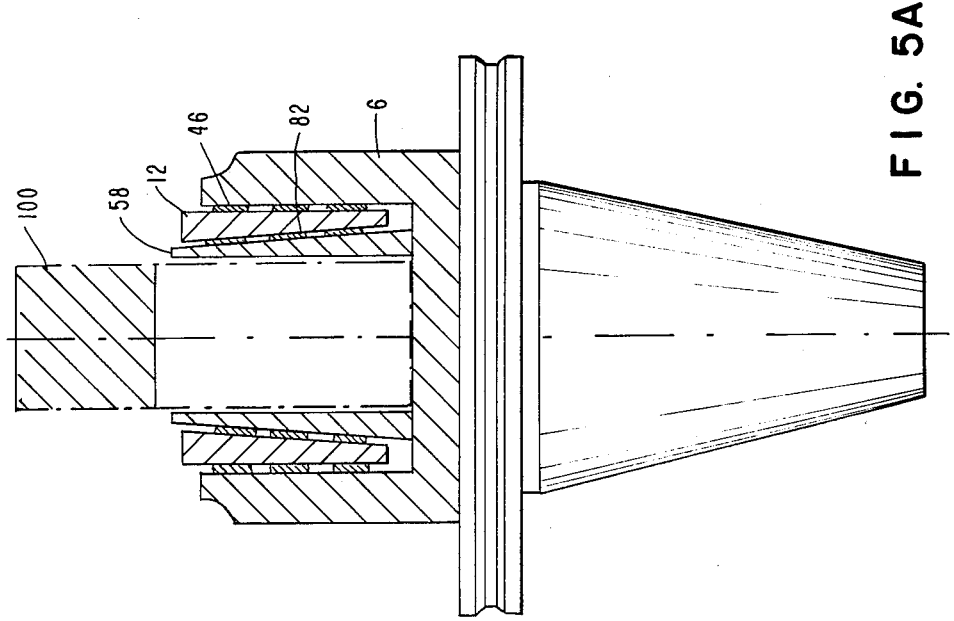
FIG. 5A is a partial cross-sectional view of the embodiment shown in FIG. 3 showing the shaft of a cutting tool within the tool receiving housing before the application of a 360° radially centered compressive force.

Referring to FIGS. 3, 5A and 5B, there is shown another embodiment of the invention where the angle of taper B of the tube section 58, the cage 78 and the axial hole 92 of the rotatable ring 12 is inwardly directed from the respective rearward ends 74, 80 and 94 to the respective forward ends 76, 78 and 96.

When the shank 100 of the cutting tool is initially loaded into the tube section 58, it assumes the position shown in FIG. 5A. That is, the shank 100 abuts the rearward end 74 of the tube section 58. As the rotatable ring 12 is rotated, as shown in FIG. 5B, a compressive force is applied against the shank 100 in the approximate position shown by the arrow. This causes the shank 100 to rise within the tube section 58 in the direction of the arrow and thereby results in a fine axial adjustment of the cutting insert attached to the other end of the shank 100.

In this embodiment, the tube section 58 undergoes compression or tensioning causing the tube section 58 to elongate or compress when the rotatable ring 12 is tightened. As the rotatable ring 12 moves toward the tool holder 4 there is an opposing force on the tube section 58 directed away from the tool holder 4 resulting in elongation of the tube section. Conversely, as rotatable ring 12 moves toward the forward end 76 of the cutting tool receiving housing 56 there is an opposing force on the tube section 58 directed towards the tool holder 4, resulting in compression of the tube section 58.

I claim:

1. An apparatus for securing a cutting tool in a tool holder comprising:
   (a) a stationary ring mounted to the tool holder and having an axial hole adapted to circumscribe a cutting tool receiving housing extending from one end of the tool holder;
   (b) a first bearing means comprising at least one row of bearing aligned substantially parallel to the longitudinal axis of the cutting tool receiving housing and having an inner and outer bearing surface, the outer bearing surface adapted to engage the inner surface of the stationary ring;
   (c) a second bearing means comprising:
      (i) a conical housing containing at least one row of bearing receiving slots circumscribing the housing, each slot being positioned at an angle with respect to the longitudinal axis of the cutting tool receiving housing, and
      (ii) a bearing securable in each of said slots and having an inner and outer bearing surface, said inner surface adapted to engage the outer surface of the cutting tool receiving housing;
   (d) a rotatable ring adapted to rotate about the second bearing means comprising:
      (i) a conical shaped axial hole having an inner surface adapted to engage the outer bearing surface of the bearings of the second bearing means, and
      (ii) a substantially cylindrical outer surface adapted to engage the inner bearing surface of the first bearing means,
   wherein when the rotatable ring is rotated about the second bearing means, the rotatable ring exerts an essentially 360° radially centered compressive force against the cutting tool receiving housing thereby securing the cutting tool in the tool holder.

2. The apparatus of claim 1, wherein the second bearing means comprises three rows of bearing receiving slots.

3. The apparatus of claim 1, wherein the slots of the second bearing means are angled at about ½° to 10° with respect to the longitudinal axis of the cutting tool receiving housing.

4. The apparatus of claim 3, wherein the slots are angled at about 1° to 5°.

5. The apparatus of claim 1, wherein the total axial length of the rows of bearings of the conical housing of the second bearing means is about one and one half times the diameter of the bore of the cutting tool receiving housing.

6. The apparatus of claim 1, wherein the conical shaped axial hole of the rotatable ring and the conical housing of the second bearing means each have an angle of taper of from about ½° to 10°.

7. The apparatus of claim 6, wherein the angle of taper is from about 1° to 5°.

8. The apparatus of claim 1 wherein the first bearing means comprises ball bearings.

9. The apparatus of claim 1 wherein the first bearing means comprises needle bearings.

10. The apparatus of claim 1, wherein each of the conical housing of the second bearing means and the conical inner surface of the rotatable ring has a first end extending towards the tool holder and an opposed end, wherein the conical housing and conical inner surface are tapered inwardly from the first end to the opposed end.

11. The apparatus of claim 1, wherein each of the conical housing of the second bearing means and the conical inner surface of the rotatable ring has a first end extending towards the tool holder and an opposed end, wherein the conical housing and conical inner surface are tapered outwardly from the first end to the opposed end.

12. A cutting tool assembly comprising:
   (a) a tool holder having one end adapted to be inserted into a machine tool and an opposed end having a cutting tool receiving housing extending therefrom, said housing having an essentially cylindrical axial bore and a conical outer surface;

(b) a stationary ring mounted to the tool holder and having a cylindrical axial hole adapted to circumscribe the cutting tool receiving housing;

(c) a first bearing means comprising at least one row of bearings aligned substantially parallel to the longitudinal axis of the cutting tool receiving housing and having an inner and outer bearing surface, the outer bearing surface adapted to engage the inner surface of the stationary ring;

(d) a second bearing means comprising:
 (i) a conical housing containing at least one row of bearing receiving slots circumscribing the housing, each slot being positioned at an angle with respect to the longitudinal axis of the cutting tool receiving housing, and
 (ii) a bearing securable in each of said slots and having an inner and outer bearing surface, said inner surface adapted to engage the cutting tool receiving housing;

(e) a rotatable ring adapted to rotate about the second bearing means comprising:
 (i) a conical shaped axial hole having an inner surface adapted to engage the outer bearing surface of the bearings of the second bearing means, and
 (ii) a substantially cylindrical outer surface adapted to engage the inner bearing surface of the first bearing means; and (f) a cutting tool having at least one cutting insert at one end and a shank at an opposed end adapted to be inserted into the cutting tool receiving housing of the tool holder, wherein when the rotatable ring is rotated about the second bearing means, the rotatable ring exerts an essentially 360° radially centered compressive force against the cutting tool receiving housing thereby securing the cutting tool in the tool holder.

13. The cutting tool assembly of claim 12, wherein the second bearing means comprises three rows of bearing receiving slots.

14. The cutting tool assembly of claim 12, wherein the slots of the second bearing means are angled at about ½° to 10° with respect to the longitudinal axis of the cutting tool receiving housing.

15. The cutting tool assembly of claim 14, wherein the slots are angled at about 1° to 5°.

16. The cutting tool assembly of claim 12, wherein the total axial length of the rows of bearings of the conical housing of the second bearing means is about one and one half times the diameter of the bore of the cutting tool receiving housing.

17. The cutting tool assembly of claim 12, wherein the conical shaped axial hole of the rotatable ring, the conical housing of the second bearing means and the conical outer surface of the cutting tool receiving housing each has an angle of taper of from about ½° to 10°.

18. The cutting tool assembly of claim 17, wherein the angle of taper is from about 1° to 5°.

19. The cutting tool of claim 12, wherein the first bearing means comprises ball bearings.

20. The cutting tool of claim 12, wherein the first bearing means comprises needle bearings.

21. The cutting tool assembly of claim 12, wherein each of the conical housing of the second bearing means and the conical inner surface of the second ring has a first end extending towards the tool holder and an opposed end, wherein the conical housing and conical inner surface are tapered inwardly from the first end to the opposed end.

22. The cutting tool assembly of claim 12, wherein each of the conical housing of the second bearing means and the conical inner surface of the second ring has a first end extending towards the tool holder and an opposed end, wherein the conical housing and conical inner surface are tapered outwardly from the first end to the opposed end.

23. The cutting tool assembly of claim 12, wherein the cutting tool receiving housing is formed integral with the tool holder.

24. The cutting tool assembly of claim 12, wherein the cutting tool receiving housing is loosely engaged within the bore of the tool holder and is movable to a position aligned with the longitudinal axis of the tool holder when the rotatable ring is in the compressive force producing position.

25. The cutting tool assembly of claim 12, further comprising means for radially balancing the cutting tool assembly.

26. The cutting tool assembly of claim 25, wherein the balancing means comprises an annular channel having tapered side walls circumscribing the tool body and at least one balancing weight having tapered side walls, said balancing weight being releasably secured within the channel such that the tapered walls of the channel and corresponding tapered walls of the weights wedgedly engage each other when the weight is secured in the channel.

27. The cutting tool assembly of claim 12, wherein the stationary ring is integral with the tool holder.

28. The cutting tool assembly of claim 12, further comprising means for containing said components (b)-(e) in the desired position circumscribing the cutting tool receiving housing.

29. The cutting tool assembly of claim 12, further comprising means for preventing further rotation of the rotational ring after said rotational ring exerts an operable 360° radially centered compressive force on the cutting tool receiving housing.

30. The cutting tool assembly of claim 28, wherein said containment means comprises a snap ring on one end of the cutting tool receiving housing.

31. The cutting tool assembly of claim 29, wherein said rotation prevention means comprises a snap ring on the inside surface of one end of the stationary ring.

32. The cutting tool assembly of claim 12, wherein the opposed end of the tool holder comprises a continuous annular flange adapted to secure the tool holder to a machine tool.

33. An apparatus for securing a cutting tool in a tool holder comprising:
(a) a stationary ring mounted to the tool holder and having an axial hole adapted to circumscribe a cutting tool receiving housing extending from one end of the tool holder;
(b) a first bearing means having an inner and outer bearing surface, the outer bearing surface adapted to engage the inner surface of the stationary ring;
(c) a second bearing means comprising:
 (i) a conical housing containing at least one row of bearing receiving slots circumscribing the housing, and having a first end extending towards the tool holder and an opposed end wherein the conical housing tapers outwardly from the first end to the opposed end, each slot being positioned at an angle with respect to the longitudinal axis of the cutting tool receiving housing, and (ii) a bearing securable in each of said slots and having an inner and outer bearing surface, said inner surface adapted to engage the outer surface of the cutting tool receiving housing;

(d) a rotatable ring adapted to rotate about the second bearing means comprising:

(i) a conical shaped axial hole having an inner surface having a first end and an opposed end, said surface tapering outwardly from the first to the opposed end and adapted to engage the outer bearing surface of the bearings of the second bearing means, and (ii) a substantially cylindrical outer surface adapted to engage the inner bearing surface of the first bearing means, wherein when the rotatable ring is located about the second bearing means, the rotatable ring exerts an essentially 360° radially centered compressive force against the cutting tool receiving housing thereby securing the cutting tool in the tool holder.

34. The apparatus of claim 33, wherein the second bearing means comprises three rows of bearing receiving slots.

35. The apparatus of claim 33, wherein the slots of the second bearing means are angled at about ½° to 10° with respect to the longitudinal axis of the cutting tool receiving housing.

36. The apparatus of claim 33, wherein the total axis length of the rows of bearings of the conical housing of the second bearing means is about one and one half times the diameter of the bore of the cutting tool receiving housing.

37. The apparatus of claim 33, wherein the conical shaped axial hole of the rotatable ring and the conical housing of the second bearing means each have an angle of taper of from about ½° to 10°.

38. The apparatus of claim 33, wherein the first bearing means comprises at least one row of bearings aligned substantially parallel to the longitudinal axis of the cutting tool receiving housing.

39. A cutting tool assembly comprising:

(a) a tool holder having one end adapted to be inserted into a machine tool and an opposed end having a cutting tool receiving housing extending therefrom, said housing having an essentially cylindrical axial bore and a conical outer surface;

(b) a stationary ring mounted to the tool holder and having a cylindrical axial hole adapted to circumscribe the cutting tool receiving housing;

(c) a first bearing means having an inner and outer bearing surface, the outer bearing surface adapted to engage the inner surface of the stationary ring;

(d) a second bearing means comprising:

(i) a conical housing containing at least one row of bearing receiving slots circumscribing the housing and having a first end extending toward the tool holder and an opposed end wherein the conical housing tapers outwardly from the first end to the opposed end, each slot being positioned at an angle with respect to the longitudinal axis of the cutting tool receiving housing, and (ii) a bearing securable in each of said slots and having an inner and outer bearing surface, said inner surface adapted to engage the cutting tool receiving housing;

(e) a rotatable ring adapted to rotate about the second bearing means comprising:

(i) a conical shaped axial hole having an inner surface having a first end and an opposed end, said surface tapering outwardly from the first end to the opposed end and adapted to engage the outer bearing surface of the bearings of the second bearing means, and (ii) a substantially cylindrical outer surface adapted to engage the inner bearing surface of the first bearing means; and (f) a cutting tool having at least one cutting insert at one end and a shank at an opposed end adapted to be inserted into the cutting tool receiving housing of the tool holder, wherein when the rotatable ring is rotated about the second bearing means, the rotatable ring exerts an essentially 360° radially centered compressive force against the cutting tool receiving housing thereby securing the cutting tool in the tool holder.

40. The cutting tool assembly of claim 39, wherein the second bearing means comprises three rows of bearing receiving slots.

41. The cutting tool assembly of claim 39, wherein the slots of the second bearing means are angled at about ½° to 10° with respect to the longitudinal axis of the the cutting tool receiving housing.

42. The cutting tool assembly of claim 39, wherein the total axial length of the rows of bearings of the conical housing of the second bearing means is about one and one half times the diameter of the bore of the cutting tool receiving housing.

43. The cutting tool assembly of claim 39, wherein the conical shaped axial hole of the rotatable ring, the conical housing of the second bearing means and the conical outer surface of the cutting tool receiving housing each has an angle of taper of from about ½° to 10°.

44. The cutting tool assembly of claim 39, wherein the first bearing means comprises at least one row of bearings aligned substantially parallel to the longitudinal axis of the cutting tool receiving housing.

45. The cutting tool assembly of claim 39, wherein the cutting tool receiving housing is formed integral with the tool holder.

46. The cutting tool assembly of claim 39, wherein the cutting tool receiving housing is loosely engage within the bore of the tool holder and is movable to a position aligned with the longitudinal axis of the tool holder when the rotatable ring is in the compressive force producing position.

47. The cutting tool assembly of claim 39, further comprising means for radially balancing the cutting tool assembly.

48. The cutting tool assembly of claim 47, wherein the balancing means comprises an annular channel having tapered side walls circumscribing the tool body and at least one balancing weight having tapered side walls, said balancing weight being releasably secured within the channel such that the tapered walls of the channel and corresponding tapered walls of the weights wedgedly engage each other when the weight is secured in the channel.

49. The cutting tool assembly of claim 39, wherein the stationary ring is integral with the tool holder.

50. The cutting tool assembly of claim 39, further comprising means for containing said components (b)–(e) in the desired position circumscribing the cutting tool receiving housing.

51. The cutting tool assembly of claim 39, further comprising means for preventing further rotation of the rotational ring after said rotational ring exerts an operable 360° radially centered compressive force on the cutting tool receiving housing.

52. The cutting tool assembly of claim 50, wherein said containment means comprises a snap ring on one end of the cutting tool receiving housing.

53. The cutting tool assembly of claim 51, wherein said rotation prevention means comprises a snap ring on the inside surface of one end of the stationary ring.

54. The cutting tool assembly of claim 39, wherein the opposed end of the tool holder comprises a continuous annular flange adapted to secure the tool holder to a machine tool.

* * * * *